(12) United States Patent
Torchalski et al.

(10) Patent No.: US 9,613,242 B2
(45) Date of Patent: *Apr. 4, 2017

(54) APPARATUS AND METHOD FOR COMMUNICATING WITH AN RFID TRANSPONDER

(71) Applicant: ZIH Corp., Lincolnshire, IL (US)

(72) Inventors: Karl Torchalski, Arlington Heights, IL (US); Daniel F. Donato, Johnsburg, IL (US)

(73) Assignee: ZIH Corp., Lincolnshire, IL (US)

( * ) Notice: Subject to any disclaimer, the term of this patent is extended or adjusted under 35 U.S.C. 154(b) by 33 days.

This patent is subject to a terminal disclaimer.

(21) Appl. No.: 14/069,315

(22) Filed: Oct. 31, 2013

(65) Prior Publication Data

US 2014/0132399 A1    May 15, 2014

Related U.S. Application Data

(63) Continuation of application No. 11/121,208, filed on May 3, 2005, now Pat. No. 8,596,532.

(Continued)

(51) Int. Cl.
*G06F 15/12* (2006.01)
*G06K 7/10* (2006.01)
(Continued)

(52) U.S. Cl.
CPC ........ *G06K 7/10445* (2013.01); *B41J 3/4075* (2013.01); *G06K 7/10079* (2013.01);
(Continued)

(58) Field of Classification Search
CPC ............. G06K 7/0008; G06K 19/0723; G06K 17/0025; G06K 2017/0041; G06K 7/10346;
(Continued)

(56) References Cited

U.S. PATENT DOCUMENTS 3,742,319 A   6/1973 Bryan et al.
3,760,278 A   9/1973 Narbaits-Jaureguy et al.
(Continued)

FOREIGN PATENT DOCUMENTS

DE   9321478   8/1998
EP   0414628   2/1991
(Continued)

OTHER PUBLICATIONS

International Search Report for PCT/US2004/027832, dated May 6, 2005 and Written Opinion. available in U.S. Appl. No. 11/121,208 to which priority is claimed.

(Continued)

*Primary Examiner* — Christopher Stanford
*Assistant Examiner* — Tae Kim

(57) ABSTRACT

A system having a UHF RFID transceiver is adapted to communicate exclusively with a single electro-magnetically coupled transponder located in a predetermined confined transponder operating region. The system includes a near field coupling device comprising a plurality of lines connected in parallel with an unmatched load. The near field coupling device may be formed, for example on a printed circuit board with a plurality of electrically interconnected traces and a ground plane. The system establishes, at predetermined transceiver power levels, a mutual electro-magnetic coupling which is selective exclusively for a single transponder located in a defined transponder operating region. Also included are methods for selective communication with the transponder in an apparatus such as a printer-encoder.

6 Claims, 15 Drawing Sheets
(4 of 15 Drawing Sheet(s) Filed in Color)

Related U.S. Application Data

(60) Provisional application No. 60/578,544, filed on Jun. 10, 2004.

(51) Int. Cl.
  *B41J 3/407* (2006.01)
  *G06K 17/00* (2006.01)
  *H04B 5/00* (2006.01)

(52) U.S. Cl.
  CPC ..... *G06K 7/10158* (2013.01); *G06K 7/10336* (2013.01); *G06K 17/00* (2013.01); *G06K 17/0025* (2013.01); *H04B 5/0068* (2013.01)

(58) Field of Classification Search
  CPC .. G06K 19/07749; G06K 5/02; G06K 7/0095; G06K 7/10297; G06K 7/10316; G06K 7/10336; G06K 7/10465; B41J 11/0095
  USPC ........................................................ 235/432
  See application file for complete search history.

(56) References Cited

U.S. PATENT DOCUMENTS

| | | | |
|---|---|---|---|
| 4,371,876 A | 2/1983 | Nash | |
| 4,509,039 A | 4/1985 | Dowdle | |
| 5,006,812 A | 4/1991 | Erickson | |
| 5,170,486 A | 12/1992 | Thomas | |
| 5,278,571 A | 1/1994 | Helfrick | |
| 5,294,931 A | 3/1994 | Meier | |
| 5,317,646 A | 5/1994 | Sang, Jr. et al. | |
| 5,369,381 A | 11/1994 | Gamand | |
| 5,373,266 A | 12/1994 | Lenzing et al. | |
| 5,521,601 A | 5/1996 | Kandlur et al. | |
| 5,587,578 A | 12/1996 | Serra | |
| 5,608,417 A * | 3/1997 | de Vall | 343/895 |
| 5,652,711 A | 7/1997 | Vennekens | |
| 5,777,586 A | 7/1998 | Luxon et al. | |
| 5,835,010 A * | 11/1998 | Asakura | B60R 25/04 307/10.3 |
| 5,838,253 A | 11/1998 | Wurz et al. | |
| 5,926,133 A | 7/1999 | Green, Jr. | |
| 5,983,243 A | 11/1999 | Heiney et al. | |
| 6,012,083 A | 1/2000 | Savitzky et al. | |
| 6,067,475 A | 5/2000 | Graves et al. | |
| 6,104,291 A | 8/2000 | Beauvillier et al. | |
| 6,118,379 A | 9/2000 | Kodukula et al. | |
| 6,154,137 A | 11/2000 | Goff et al. | |
| 6,181,287 B1 | 1/2001 | Beigel | |
| 6,195,007 B1 | 2/2001 | Takayama et al. | |
| 6,215,402 B1 | 4/2001 | Rao Kodukula et al. | |
| 6,246,326 B1 | 6/2001 | Wiklof et al. | |
| 6,267,521 B1 | 7/2001 | Lodwig et al. | |
| 6,327,972 B2 | 12/2001 | Heredia et al. | |
| 6,346,881 B1 | 2/2002 | Davidson | |
| 6,392,544 B1 | 5/2002 | Collins et al. | |
| 6,409,401 B1 | 6/2002 | Petteruti et al. | |
| 6,424,262 B2 | 7/2002 | Garber et al. | |
| 6,466,131 B1 | 10/2002 | Tuttle et al. | |
| 6,470,082 B1 | 10/2002 | Nunokawa et al. | |
| 6,473,028 B1 | 10/2002 | Luc | |
| 6,486,769 B1 | 11/2002 | McLean | |
| 6,527,356 B1 | 3/2003 | Spurr et al. | |
| 6,556,822 B1 | 4/2003 | Matsumoto | |
| 6,593,853 B1 | 7/2003 | Barrett et al. | |
| 6,750,771 B1 | 6/2004 | Brand | |
| 6,802,659 B2 | 10/2004 | Cremon et al. | |
| 6,848,616 B2 | 2/2005 | Tsirline et al. | |
| 6,857,714 B2 | 2/2005 | Hohberger et al. | |
| 6,899,476 B1 | 5/2005 | Barrus et al. | |
| 6,929,412 B1 | 8/2005 | Barrus et al. | |
| 6,938,976 B2 | 9/2005 | Siwinski et al. | |
| 6,969,134 B2 | 11/2005 | Hohberger et al. | |
| 6,985,754 B1 | 1/2006 | Pedersen et al. | |
| 7,023,341 B2 * | 4/2006 | Stilp | G06K 7/0008 340/545.1 |
| 7,023,391 B2 | 4/2006 | Wuidart et al. | |
| 7,142,815 B2 | 11/2006 | Desjeux et al. | |
| 7,190,270 B2 | 3/2007 | Brown et al. | |
| 7,369,036 B1 | 5/2008 | Vacherand et al. | |
| 7,398,054 B2 * | 7/2008 | Tsirline et al. | 455/41.1 |
| 7,425,887 B2 | 9/2008 | Tsirline et al. | |
| 7,650,114 B2 | 1/2010 | Tsirline et al. | |
| 8,078,103 B2 | 12/2011 | Borisov et al. | |
| 8,160,493 B2 | 4/2012 | Tsirline et al. | |
| 8,351,959 B2 | 1/2013 | Tsirline et al. | |
| 8,544,740 B2 | 10/2013 | Torchalski et al. | |
| 8,596,532 B2 * | 12/2013 | Torchalski et al. | 235/432 |
| 2001/0000430 A1 | 4/2001 | Smith et al. | |
| 2001/0029857 A1 | 10/2001 | Heredia et al. | |
| 2001/0038333 A1 | 11/2001 | Keskilammi et al. | |
| 2002/0003498 A1 | 1/2002 | Wuidart et al. | |
| 2002/0062898 A1 | 5/2002 | Austin et al. | |
| 2002/0167397 A1 * | 11/2002 | Eroglu et al. | 340/10.6 |
| 2002/0171602 A1 * | 11/2002 | Feibig et al. | 343/907 |
| 2003/0063001 A1 | 4/2003 | Hohberger et al. | |
| 2003/0067504 A1 | 4/2003 | Spurr et al. | |
| 2003/0097302 A1 | 5/2003 | Overhultz et al. | |
| 2003/0104848 A1 | 6/2003 | Brideglall | |
| 2003/0173408 A1 | 9/2003 | Mosher, Jr. et al. | |
| 2003/0224805 A1 | 12/2003 | Suenaga | |
| 2004/0095242 A1 | 5/2004 | Grose et al. | |
| 2004/0178267 A1 | 9/2004 | Tsirline et al. | |
| 2004/0195319 A1 | 10/2004 | Forster | |
| 2004/0203605 A1 | 10/2004 | Safa | |
| 2005/0032267 A1 | 2/2005 | Liu et al. | |
| 2005/0045723 A1 | 3/2005 | Tsirline et al. | |
| 2005/0045724 A1 | 3/2005 | Tsirline et al. | |
| 2005/0099269 A1 | 5/2005 | Diorio et al. | |
| 2005/0206524 A1 | 9/2005 | Forster et al. | |
| 2005/0221764 A1 * | 10/2005 | Shen et al. | 455/67.15 |
| 2005/0274799 A1 | 12/2005 | Torchalski et al. | |
| 2006/0030281 A1 | 2/2006 | Brunel et al. | |
| 2006/0037502 A1 | 2/2006 | Warther | |
| 2006/0205443 A1 * | 9/2006 | Simoens et al. | 455/574 |
| 2007/0063843 A1 | 3/2007 | Tsirline et al. | |
| 2007/0080867 A1 | 4/2007 | Son et al. | |
| 2007/0099566 A1 | 5/2007 | Borisov et al. | |
| 2007/0176781 A1 | 8/2007 | Brown et al. | |
| 2009/0303047 A1 | 12/2009 | Rinkes | |
| 2010/0177080 A1 | 7/2010 | Essinger et al. | |
| 2010/0177707 A1 | 7/2010 | Essinger et al. | |
| 2010/0245054 A1 | 9/2010 | Kim | |
| 2012/0092130 A1 | 4/2012 | Chung et al. | |
| 2014/0002243 A1 | 1/2014 | Tsirline et al. | |
| 2015/0161426 A1 | 6/2015 | Torchalski et al. | |

FOREIGN PATENT DOCUMENTS

| | | |
|---|---|---|
| EP | 0568066 | 11/1993 |
| EP | 0568067 | 11/1993 |
| EP | 0704815 | 4/1996 |
| EP | 1224607 | 7/2002 |
| EP | 1233367 | 8/2002 |
| EP | 1394719 | 3/2004 |
| GB | 2321551 | 7/1998 |
| JP | 2003132330 | 5/2003 |
| WO | 01/35320 | 5/2001 |
| WO | 2005/022445 | 3/2005 |

OTHER PUBLICATIONS

K.C. Gupta, Ramesh Garg, Inder Bahl, Prakash Bhartia, Microstrip Lines and Slotlines, Second Edition, 1996, Artech House, Inc. available in U.S. Appl. No. 11/121,208 to which priority is claimed.

McMillan, et al., Leaky Fields on Microstrip, Progress in Electromagnetics Research, Pier 17, pp. 323-377, 1997 USA. available in U.S. Appl. No. 11/121,208 to which priority is claimed.

Maloratsky, Reviewing the Basics of Microstrip Lines, Microwaves & RF, pp. 79-88, Mar. 2000, USA. available in U.S. Appl. No. 11/121,208 to which priority is claimed.

(56) References Cited

OTHER PUBLICATIONS

Maloratsky, Couplers Shrink HF/VHF/UHF Designs, Microwaves & RF, pp. 93-96, Jun. 2000, USA. available in U.S. Appl. No. 11/121,208 to which priority is claimed.
Maloratsky, Design Regular-and Irregular-Print Coupled Lines, Microwaves & RF, pp. 97-106, Sep. 2000 USA. available in U.S. Appl. No. 11/121,208 to which priority is claimed.
Maloratsky, The Basics of Print Reciprocal Dividers/Combiners, Microwave Journal, Sep. 2000, USA. available in U.S. Appl. No. 11/121,208 to which priority is claimed.
Maloratsky, Understand the Basics of Microstrip Directional Couplers, Microwaves & RF, pp. 79-94, Feb. 2001, USA. available in U.S. Appl. No. 11/121,208 to which priority is claimed.
Maloratsky, Improve BPF Performance With Wiggly Coupled Lines, Microwaves & RF, pp. 53-62, Apr. 2002, USA. available in U.S. Appl. No. 11/121,208 to which priority is claimed.
Maloratsky, Reviewing the Basics of Suspended Striplines, Microwave Journal, Oct. 2002, USA. available in U.S. Appl. No. 11/121,208 to which priority is claimed.
International Search Report for US2004/027832, dated Dec. 30, 2004. available in U.S. Appl. No. 11/121,208 to which priority is claimed.
Extended Search Report for European Patent Application No. 10183731.8, dated Nov. 23, 2010. available in U.S. Appl. No. 11/121,208 to which priority is claimed.
Office action issued by the United States Patent and Trademark Office on Oct. 23, 2015 in connection with U.S. Appl. No. 14/626,828. available in U.S. Appl. No. 14/626,828 which is part of USPTO records.
Office action issued by the United States Patent and Trademark Office on Mar. 31, 2015 in connection with U.S. Appl. No. 14/626,828. available in U.S. Appl. No. 14/626,828 which is part of USPTO records.
European Office Action from European Patent Application No. 07108946.0 dated Nov. 13, 2009.
Extended Search Report for European Patent Application No. 101837755.7 dated Nov. 23, 2010.
Communication from Examining Division mailed in connection with European Patent Application No. 10183731.8 on Nov. 23, 2010.
Communication from Examining Division mailed in connection with European Patent Application No. 10183731.8 on Dec. 18, 2013.
Communication from Examining Division mailed in connection with European Patent Application No. 10183731.8 on Nov. 23, 2014.
Communication from Examining Division mailed in connection with European Patent Application No. 10183731.8 on Jun. 25, 2015.
Office action issued by the United States Patent and Trademark Office on Aug. 18, 2009 in connection with U.S. Appl. No. 11/121,208. available in U.S. Appl. No. 11/121,208 to which priority is claimed.
Second Office action issued by the the Patent Office of the People's Republic of China on Jun. 6, 2008 in connection with Chinese Patent Application No. 200480028785.8.
First Office action issued by the the Patent Office of the People's Republic of China on Nov. 9, 2007 in connection with Chinese Patent Application No. 200480028785.8.
Office action issued by the United States Patent and Trademark Office on Mar. 17, 2015 in connection with U.S. Appl. No. 13/712,829.
Office action issued by the United States Patent and Trademark Office on Oct. 7, 2015 in connection with U.S. Appl. No. 13/712,829.
Office action issued by the United States Patent and Trademark Office on Sep. 22, 2016 in connection with U.S. Appl. No. 13/712,829.
Office action issued by the United States Patent and Trademark Office on Jan. 15, 2016 in connection with U.S. Appl. No. 14/626,828.
Office action issued by the United States Patent and Trademark Office on Jul. 29, 2016 in connection with U.S. Appl. No. 14/626,828.

* cited by examiner

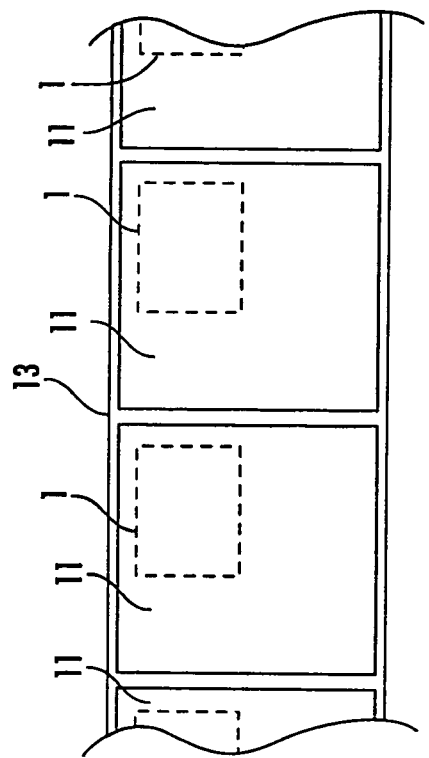
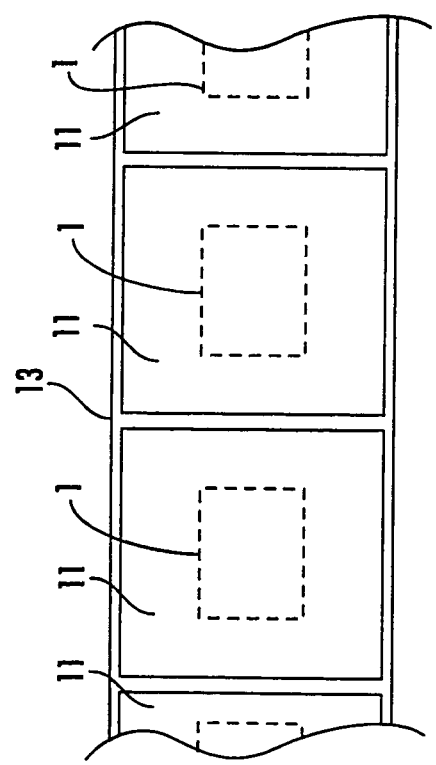
FIG. 6a
FIG. 6b

| TRANSPONDER TYPE | READ POWER LEVELS | | | WRITE POWER LEVELS | | |
|---|---|---|---|---|---|---|
| 1 | $P_{R1}$ | $P_{R2}$ | $P_{R3}$ | $R_{W1}$ | $R_{W2}$ | $R_{W3}$ |
| 2 | $P_{R1}'$ | $P_{R2}'$ | $P_{R3}'$ | $R_{W1}'$ | $R_{W2}'$ | $R_{W3}'$ |
| 3 | $P_{R1}''$ | $P_{R2}''$ | $P_{R3}''$ | $R_{W1}''$ | $R_{W2}''$ | $R_{W3}''$ |

APPARATUS AND METHOD FOR COMMUNICATING WITH AN RFID TRANSPONDER

CROSS-REFERENCES TO RELATED APPLICATIONS

This application is a continuation of U.S. patent application Ser. No. 11/121,208, filed May 3, 2005, now U.S. Pat. No. 8,596,532, which claims the benefit of U.S. Provisional Application No. 60/578,544, filed Jun. 10, 2004, each of which is incorporated by reference herein in its entirety.

BACKGROUND OF THE INVENTION

1. Field of the Invention

The invention relates to RFID systems, operable with a variety of different dimensioned electro-magnetically coupled transponders, working at close proximity, to an RF transceiver antenna that is spatially selective for an individual transponder located in a predetermined transponder operating region to the exclusion of other adjacent transponders, and its application to printers-encoders or other systems utilizing such in UHF RFID systems.

2. Description of Related Art

UHF radio frequency identification (RFID) technology allows wireless data acquisition and or transmission from and or to active (battery powered) or passive transponders using a backscatter technique. To communicate with, i.e., "read" from and or "write" commands and/or data to a transponder, the transponder is exposed to an RF electro-magnetic field by the transceiver that couples with and energizes (if passive) the transponder through electro-magnetic induction and transfers commands and data using a predefined "air interface" RF signaling protocol.

When multiple passive transponders are within the range of the same RF transceiver electro-magnetic field they will each be energized and attempt to communicate with the transceiver, potentially causing errors in "reading" and or "writing" to a specific transponder in the reader field. Anti-collision management techniques exist to allow near simultaneous reading and writing to numerous closely grouped transponders in a common RF electro-magnetic field. However, anti-collision management increases system complexity, cost and delay response. Furthermore, anti-collision management is "blind" in that it cannot recognize where a specific transponder being processed is physically located in the RF electro-magnetic field, for example, which transponder is located proximate the print head of a printer-encoder.

One way to prevent errors during reading and writing to transponders without using anti-collision management is to electrically isolate a specific transponder of interest from nearby transponders. Previously, isolation of transponders has used RF-shielded housings and/or anechoic chambers through which the transponders are individually passed for personalized exposure to the interrogating RF field. This requires that the individual transponders have cumbersome shielding or a significant spatial separation.

RFID printers-encoders have been developed which are capable of on-demand printing on labels, tickets, tags, cards or other media with which a transponder is attached or embedded. These printer-encoders have a transceiver for on-demand communicating with the transponder on the individual media to read and/or store data into the attached transponder. For the reasons given, it is highly desirable in many applications to present the media on rolls or other format in which the transponders are closely spaced. However, close spacing of the transponders exacerbates the task of serially communicating with each individual transponder without concurrently communicating with neighboring transponders on the media. This selective communication exclusively with an individual transponder is further exacerbated in printers-encoders designed to print on the media in or near the same space as the transponder is positioned when being interrogated.

When transponders are supplied attached to a carrier substrate, for example in RFID-attached labels, tickets, tags or other media supplied in bulk rolls, Z-folded stacks or other format, an extra length of the carrier substrate is required to allow one transponder on the carrier substrate to exit the isolated field area before the next transponder in line enters it. The extra carrier substrate increases materials costs and the required volume of the transponder media bulk supply for a given number of transponders. Having increased spacing between transponders may also slow overall printer-encoder throughput.

When transponders of different sizes and form factors are processed, the RF shielding and or anechoic chamber configuration will also require reconfiguration, adding cost, complexity and reducing overall productivity. In certain printer-encoders it is desired to print on transponder-mounting media in the same transponder operating region in which the transponder is being read from or written to. This may be very difficult to accomplish if the transponder also must be isolated in a shielded housing or chamber.

UHF transponders may operate in, for example, the 902-928 MHz band in the United States and other ISM bands designated in different parts of the world. For example, in FIG. 1 a conventional one-half wavelength "Forward Wave" microstrip prior art coupler 3 consisting of a, for example, rectangular conductive strip 5 upon a printed circuit board 7 having a separate ground plane 9 layer configured for these frequencies. One end of the conductive strip 5 is connected to transceiver 42 and the other end is connected through terminating resistor 8 to ground plane 9. The conductive strip 5 as shown in FIG. 1 has a significant width due to RF design requirements imposed by the need to create acceptable frequency response characteristics. This type of prior art coupler 3 has been used with UHF transponders that are relatively large compared to the extent of prior art coupler 3.

As shown by FIGS. 2a and 2b, recently developed transponders 1, designed for operation at UHF frequencies, have one dimension so significantly reduced, here for example a few millimeters wide, that they will be activated upon passage proximate the larger prior art coupler 3 by electro-magnetic power leakage 10 concentrated at either side edge of the conductive strip 5 of prior art coupler 3. In FIG. 2A, the two leakage regions "A" and "B" defined by electro-magnetic power leakage 10 are small and relatively far apart, increasing system logical overhead and media conveyance positioning accuracy requirements. If the transponders 1 were placed close together, then multiple transponders 1 might be activated by the physically extensive one-half wavelength "Forward Wave" microstrip prior art coupler 3.

Thus the minimum required spacing of these transponders 1 to isolate them, and thus the minimum size of media 11 (assuming that they are embedded one per label or media 11 on carrier substrate 13) must be large relative to the size of the microstrip coupler 3. This creates issues for media suppliers by limiting the available space on the media 11 for transponder 1 placement and significantly increasing the necessary accuracy of the transponder 1 placement within and or under the printable media 11 and along the liner or carrier substrate 13. This also reduces the cost advantages of using the narrow dimensioned transponder(s) 1 within media 11, as the media 11 must be much larger than the transponder 1 to achieve adequate RF isolation.

Competition in the market for such "integrated" printer-encoder systems as well as other RFID interrogation systems has focused attention on the ability to interrogate with high spatial selectivity any transponder from a wide range of available transponders having different sizes, shapes and coupling characteristics as well as minimization of overall system, media size, and transponder costs.

Therefore, it is an object of the invention to provide a device, systems, and methods that overcome deficiencies in such prior art.

BRIEF DESCRIPTION OF THE SEVERAL VIEWS OF THE DRAWING(S)

The accompanying drawings, which are incorporated in and constitute a part of this specification, illustrate embodiments of the invention and, together with a general description of the invention given above, and the detailed description of the embodiments given below, serve to explain the principles of the invention. The patent or application file contains at least one drawing executed in color. Copies of this patent or patent application publication with color drawing(s) will be provided by the Office upon request and payment of the necessary fee.

FIG. 2b is a partial cut-away top schematic view of the prior art forward wave coupler and carrier substrate with embedded transponders of FIG. 2a.

FIG. 5b is a partial cut-away top schematic view of the coupler according to the invention and carrier substrate with embedded transponders of FIG. 5a.

FIGS. 6a and 6b are top views of carrier substrates illustrating different positions of the RFID transponders according to other embodiments of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention concerns apparatus and method which enables an RFID transceiver (sometimes termed herein an "interrogator") to communicate selectively and exclusively with a single UHF transponder 1 when one or more other similar transponders are in close proximity, without the need for physical isolation or cumbersome shielded housings or chambers.

The invention is useful in the reading and or data loading of UHF transponders, for example on an assembly line, in distribution centers or warehouses where on-demand RFID labeling is required, and in a variety of other applications. In many applications a transponder or a number of transponders are mounted or embedded on or in a label, ticket, tag, card or other media carried on a liner or carrier. It is often desirable to be able to print on the media before, after, or during communication with a transponder. Although this invention is disclosed here in a specific embodiment for use with a direct thermal or thermal transfer printer, it may also be used with any type of spatially selective RFID interrogation device or other types of printers using other printing technologies, including inkjet, dot-matrix, and electro-photographic methods.

In some applications a print station may be at a distance from the RFID transceiver; in others it may be necessary to accomplish the print function in the same target space occupied by the transponder when it is being interrogated.

Figure 1:
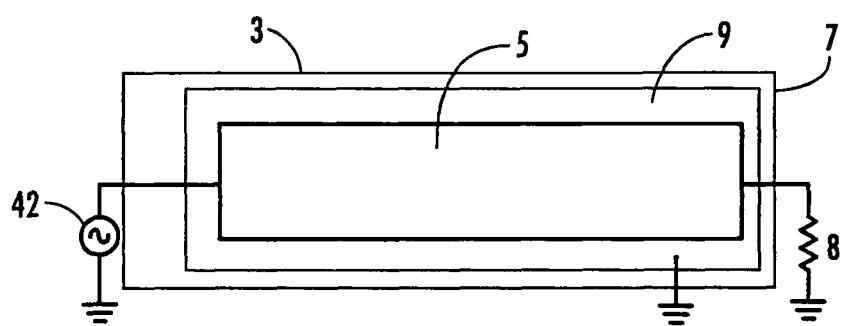
FIG. 1 is a top view of a prior art microstrip forward wave coupler.
Figure 2A:
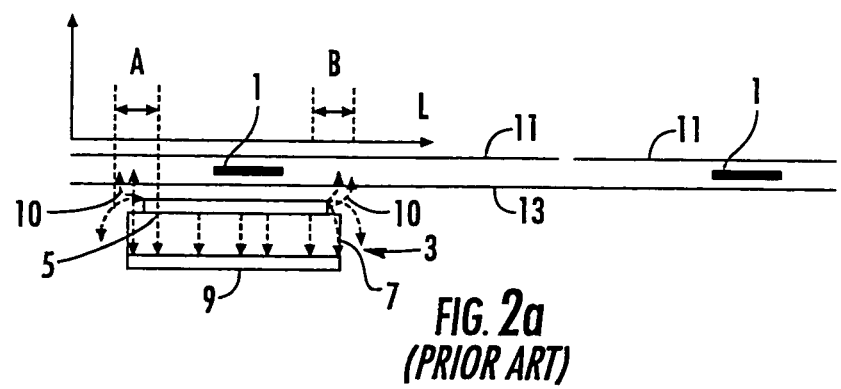
FIG. 2a is a simplified cut-away side view of a transponder-coupler structure using a prior art forward wave coupler as shown in FIG. 1, illustrating schematically locations where coupling with a narrow dimensioned transponder supplied in-line with other transponders on a carrier substrate may occur.
Figure 2B:
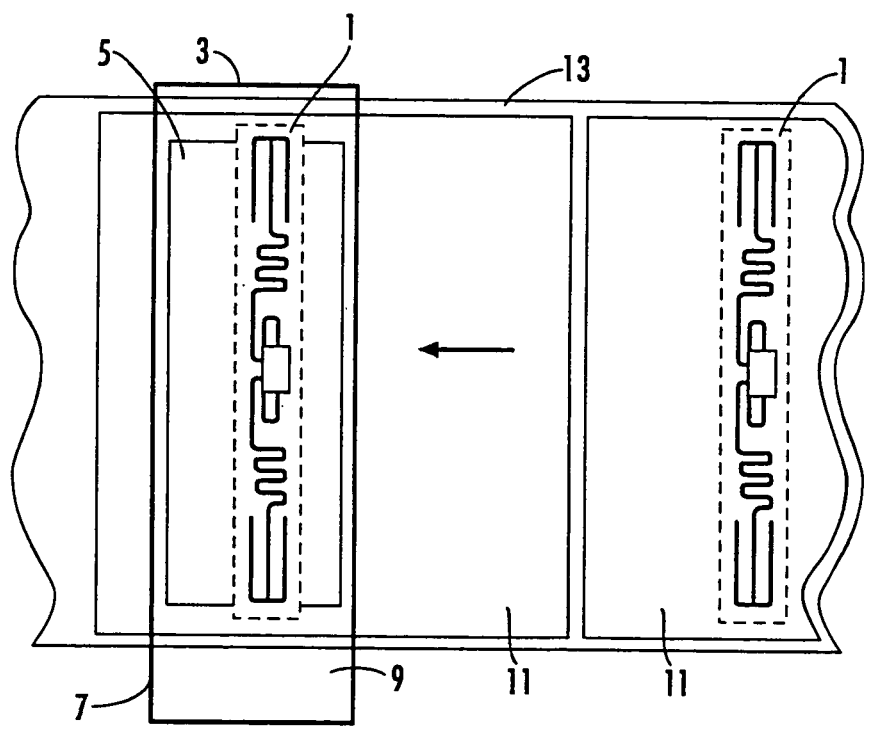
Figure 3:
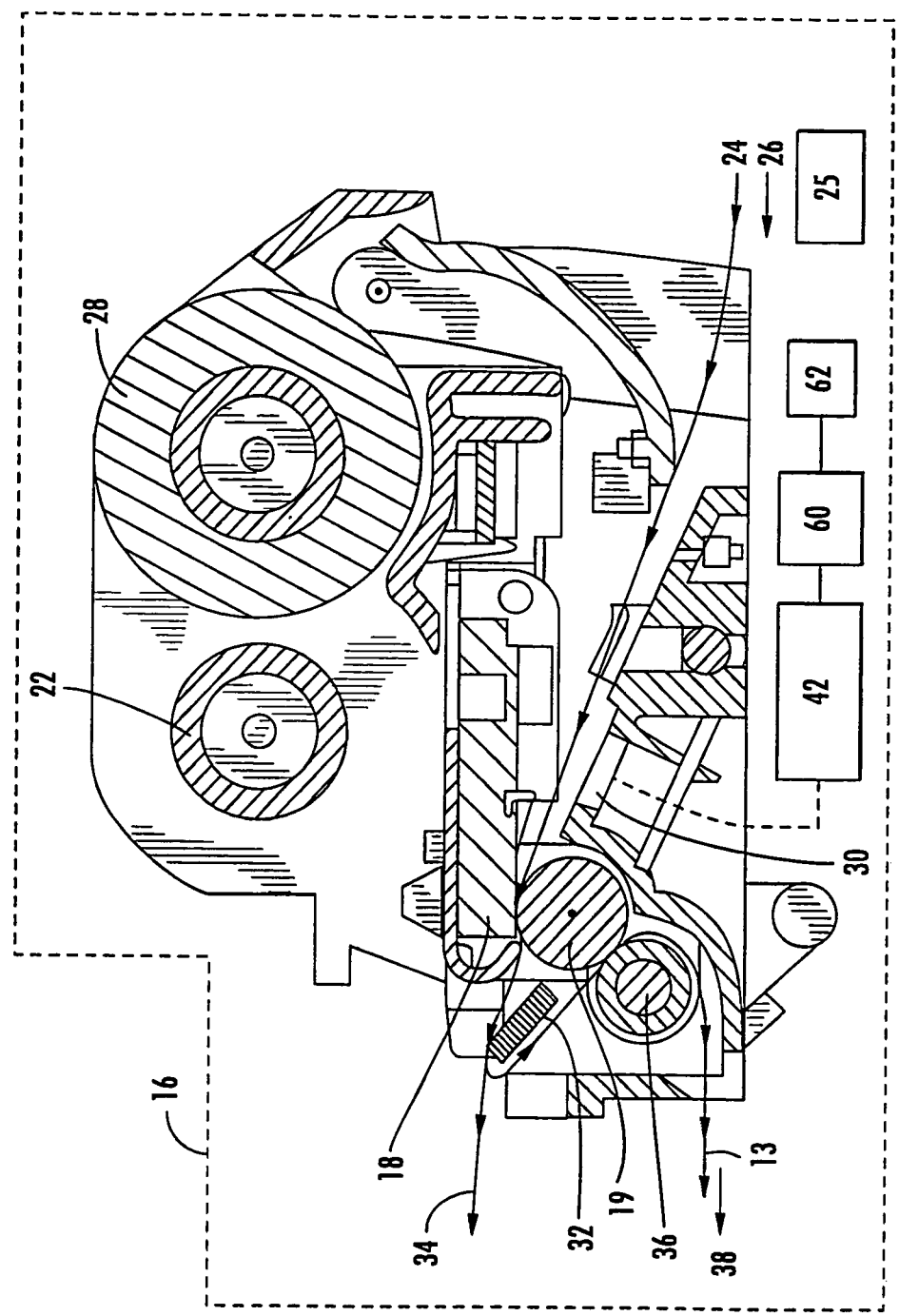
FIG. 3 is a side schematic view of a media printer according to one embodiment of the invention having an improved RFID interrogation system.

FIG. 3 illustrates by way of example only an implementation of the invention in a thermal transfer media printer 16 in which both printing and transponder communication are accomplished, but at different locations in the media printer 16. The media printer 16 includes a printhead sub-assembly comprising a conventional thermal printhead 18 and platen roller 19, as in a direct thermal printer for printing on thermally-sensitive media. A web 24 of media 11, such as labels, tickets, tags or cards, is directed along a feed path 26 under the printhead 18 where on-demand printing of text, bar codes and/or graphics takes place under control of a computer or microprocessor (not shown). After being printed, the media 11 follows a media exit path 34 and may be peeled off the underlying carrier substrate 13 at a peeler bar 32. The liner or carrier substrate 13 for the media is guided out of the media printer 16 by a roller 36 where it exits the printer along a carrier exit path 38.

When a thermal printer is configured for use as a thermal transfer printer, a ribbon supply roll 28 delivers a thermal transfer ribbon (not shown for clarity) between printhead 14 and the media on web 24. After use, the spent ribbon is collected on a take-up reel 22.

In accordance with an aspect of the present invention, the media printer 16 includes a transceiver 42 for generating RF communication signals that are fed to a frequency and spatially selective microstrip near field coupler 30 located proximate the media feed path 26. As will be explained and illustrated in detail hereinafter, the system (including transceiver 42 and near field coupler 30) forms a near field pattern in the location of a transponder operating region C (see FIG. 5A). The system is configured to establish at predetermined transceiver power levels a mutual coupling which exclusively activates and communicates with a single transponder 1 located in the transponder operating region C.

As labels or other media 11 with embedded transponders 1 move along the media feed path 26 through transponder operating region "C", data may be read from and or written to each transponder 1. Information indicia then may be printed upon an external surface of the media 11 as the media passes between the platen roller 19 and the printhead 18 by selective excitation of the heating elements in the printhead 18, as is well known in the art. When the media printer 16 is configured as a direct thermal printer, the heating elements form image dots by thermochromic color change in the heat sensitive media; when the media printer 16 is configured as a thermal transfer printer, then ink dots are formed by melting ink from the thermal transfer ribbon (not shown for clarity) delivered between printhead 18 and the media on web 24 from ribbon supply roll 28. Patterns of printed dots thus form the desired information indicia on the media 11, such as text, bar codes or graphics.

Media conveyance is well known in the art. Therefore the media conveyance 25 portion of the printer that drives the media with transponders along the media feed path 26 is not described in detail.

The near field coupler 30 according to the invention and its manner of operation will now be described with reference to FIGS. 4a-5b. One embodiment of the near field coupler 30 is configured for use, for example, with UHF RFID transponders. The RFID transponders 1 may be bulk supplied on a carrier substrate 13 attached to or embedded within label, ticket, card or tag media 11.

Figure 4A:
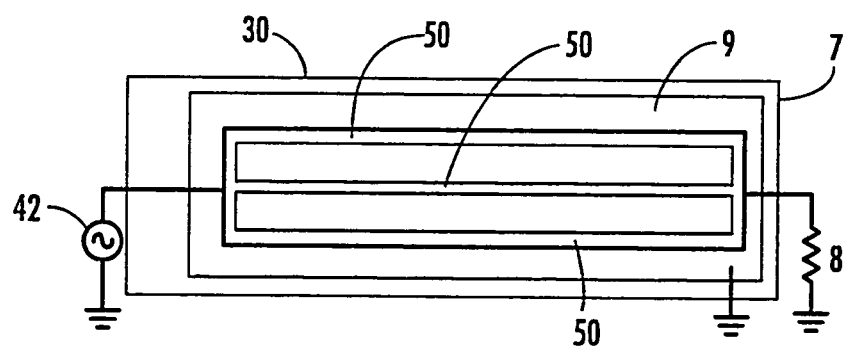
FIG. 4a is a top view of a coupler according to one embodiment of the invention.
Figure 4B:
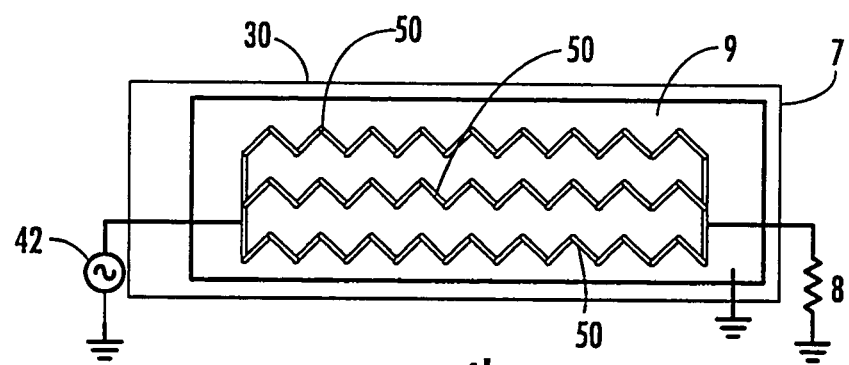
FIG. 4b is a top view of a coupler according to another embodiment of the invention.

The near field coupler 30 comprises an array of lines 50, as shown for example in FIGS. 4a and 4b. The near field coupler 30 may be configured as a segment of unmatched line 50 upon a dielectric substrate, for example a printed circuit board 7, having a ground plane 9 formed on a spaced apart isolated layer, for example the reverse side of the printed circuit board 7. One end of the array of lines 50 is connected to the transceiver 42; the other end is connected to the ground plane 9 by means of terminating resistor 8.

Figure 5A:
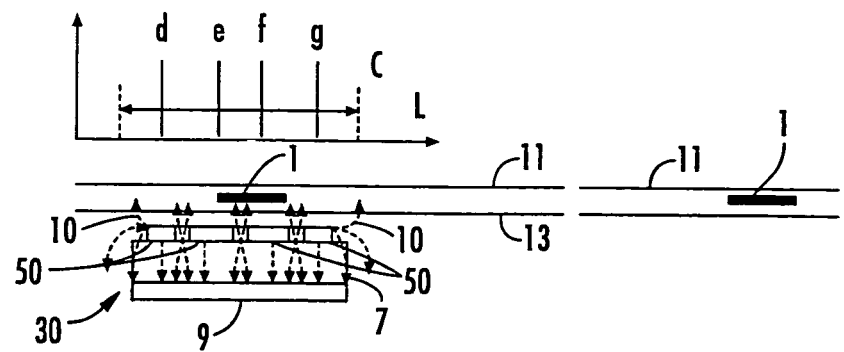
FIG. 5a is a simplified cut-away side view of a transponder-coupler structure using a coupler according to the invention, illustrating schematically the spaced apart areas where coupling with a narrow dimensioned transponder supplied in-line with other transponders on a carrier substrate may occur.

Rather than operating as a standing wave radiating antenna, or magnetic field generating coil, the near field coupler 30 according to the invention operates as a one half wavelength unmatched transmission line with, for example, a 15 ohm characteristic impedance that is terminated by a R=50 ohm terminating resistor 8. Signals generated by the transceiver 42 passing along the transmission line generate a near field effect emanating from the transmission line edges that couples with a transponder 1 passing through the transponder operating region. Another description for the near field effect is "leaky", as discussed in "Leaky Fields on Microstrip" L. O. McMillian et al. Progress in Electromagnetics Research, PIER 17, 323-337, 1997 and hereby incorporated by reference in the entirety. Because the near field effect is extremely local to the transmission line and degrades at an exponential rate with increasing distance from the transmission line, the resulting transponder operating region of a single transmission line is very narrow. According to the invention, the prior rectangular conductive strip is therefore replaced with an array formed by a plurality of commonly fed and terminated, i.e., electrically parallel, line(s) 50, as shown for example in FIGS. 4a and 4b. The plurality of line(s) 50 therefore creates an array of leaky edges as shown in FIG. 5a; each leaky edge creating an electro-magnetic power leakage 10 at several points within transponder operating region C. The resulting line array has similar overall width to the prior solid microstrip coupler 3 and may be similarly tuned, by adjusting the length, spacing and dielectric properties between the line(s) 50 and the ground plane 9 as well as the number of line(s) 50 and or individual line widths, shapes and inter-spacing, to adjust the overall array as an integrated single electrical structure to have the desired frequency response characteristics and generate a combined near field effect corresponding to a desired transponder operating region.

Figure 5B:
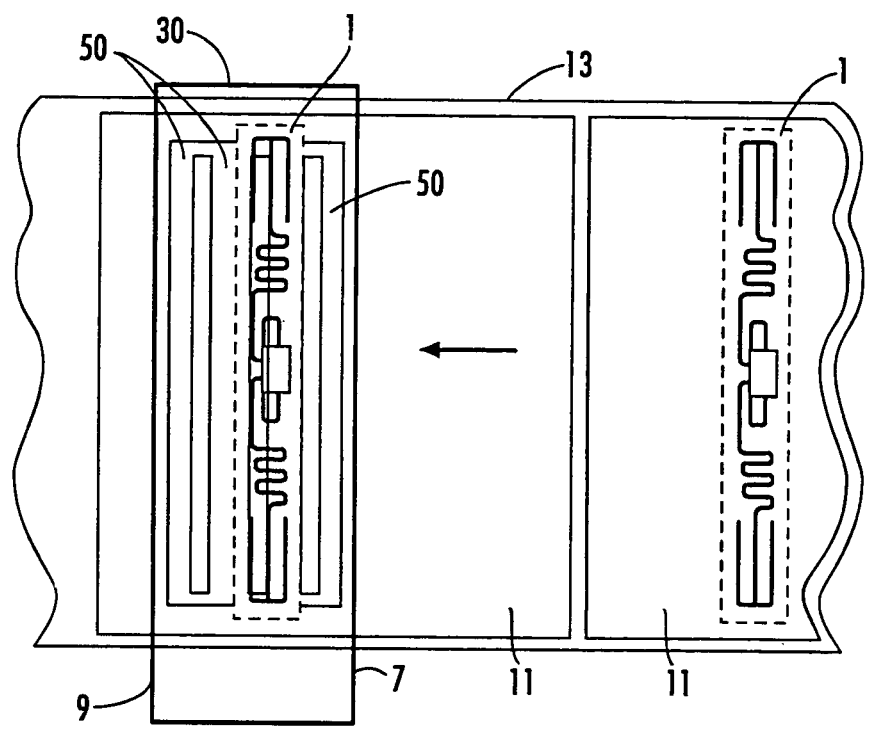

As shown by FIGS. 5a and 5b, the overall transponder operating region C resulting from a near field coupler 30 according to the invention is substantially uniform. Preferably, the distance between the coupler 30 and the web 24 is selected for critical coupling. That is, the distance is selected to be that which delivers maximum power short of being so close to the web 24 that the passing transponder(s) 1 causes the effective impedance of the coupler 30 to unacceptably vary.

In some applications, for example the modification of an existing printer configuration to add RFID read/write capability, the coupler 30 may be placed close to the web 24 due to available space and or other design considerations such as placement of the transponder operating region C proximate the printhead 18. Where the coupler 30 and the web 24 are at a close proximity to one another an impedance mismatch may occur as electrical interaction with passing transponder(s) 1 varies the effective impedance of the coupler 30. Impedance mismatch will decrease coupling range for a given output power and with significant impedance variances may cause narrow null gaps in the operational region C, for example as illustrated by d, e, f, and g in FIG. 5a, between the individual fields emitted by each line 50.

Simplified logic added to the media transport system may be used to move the media 11 forward a small increment, for example 1-2 millimeters if a transponder 1 in the transponder operating region C falls upon a null gap and transponder communications is lost.

The null gaps and the ability to control their presence by manipulating the location of the coupler 30 with respect to the web 24, are evidence of the extremely local field concentrations produced by the near field effect and the precision with which the transponder operating region may be configured to have a wide area with sharply defined boundaries. These characteristics make the near field coupler 30 useful for eliminating precision transponder placement requirements for media suppliers, complex transponder location and tracking logic in media supply systems, as well as any requirements for shielding or increased transponder placement tolerance requirements. Further, the increased transponder operating region C provided by the present invention allows users increased freedom to place embedded transponder(s) 1 in media 11 at desired locations, for example to avoid the printing degradation that may occur when the printhead encounters a media surface irregularity due to the presence of a RFID transponder 1.

The array of lines 50 of the near field coupler 30 may be formed by a plurality of straight line(s) 50 as shown in FIG. 4a. To further tune the near field produced by the line(s) 50, a zig-zag or wiggle may be applied to each line 50, as shown for example in FIG. 4b to further reduce the appearance and/or depth of the field strength gaps d, e, f and g. For the purpose of this specification, "zig-zag" is defined as a characteristic of a line having an overall length characteristic, but a plurality of direction changes internal to the overall length of the line. The direction changes may, for example, be sharply defined or occur as smooth curves.

Alternatively, a simplified transponder 1 read and or write system may be formed without printing capabilities by positioning a near field coupler 30 coupled to a transceiver 42 proximate a media conveyance 25 moving sequential transponders 1 through a transponder operating region C. This structure is also useful where the media 11 is unprinted, or printed upon at another location.

The near field coupler 30 is not limited to a dual plane structure. For example, the near field coupler 30 may be co-planar, i.e., the ground plane and the array of lines 50 may be located, electrically isolated from each other, in the same plane of a printed circuit board but on different traces. Also, the lines 50 need not be co-planar, but may form a 3-dimensional structure. For example, the lines 50 may be on multiple layers of a printed circuit board or formed as a wire frame of lines 50 without use of printed circuit board technology.

Obviously, at some exaggerated transceiver power level, certain transponders 1 outside the transponder operating region C may be excited. However, by this invention, at appropriate power levels in the range of normal transponder read and write power levels the mutual coupling created will be highly selective for the transponder 1 in the transponder operating region C. By mapping and then applying only the required power levels for a range of both different transponder 1 types and positions within the transponder operating region C, energy consumption and potential RF interference generation may be minimized.

The spatially-selective near field property and the lack of any other shielding requirements of the near field coupler 30 according to the invention allows the economical addition of a compact, spatially-selective transponder communication module in devices such as printer-encoders.

Because the near field coupler 30 may be configured to be selective exclusively for a single transponder located in the transponder operating region C, it is now possible by this invention to use a web 24 of media having transponders which are closely spaced on the web 24, as shown for example in the figures of this specification. Prior to this invention it was extremely difficult to communicate with just one electro-magnetically-coupled UHF transponder, which may have a wide number of different physical configurations, in a closely spaced series of transponders without simultaneously activating adjacent transponders.

According to another embodiment of the present invention, the printer 16 can be configured to energize the transceiver 42 to different power levels for communicating with the transponders 1. For example, the transceiver 42 can be controlled by a controller 60, as shown in FIG. 3. In some cases, the controller 60 can be a printer controller that controls other functions of the printer 16, such as the operation of the print head 18, delivery of the web 24 of media 11, and the like. The controller 60 can operate according to predetermined instructions, such as a software program that is stored in a memory 62.

The controller 60 can be configured to operate the transceiver 42 at a higher power while writing to each transponder 1 than while reading from the transponder 1. For example, in one typical operation of the printer 16, each transponder 1 is first read by the transceiver 42 and then subjected to a subsequent write/read operation. In the first read operation, the transceiver 42 can retrieve data from the transponder 1 such as the type of transponder 1, a serial number that identifies the particular transponder 1, information about the media 11 to which the transponder 1 is being attached, or the like. In addition, the transceiver 42 can determine by the first read operation whether the transponder 1 is defective. In the subsequent write/read operation, the transceiver 42 writes data to the transponder 1 and then reads at least some of the data from the transponder 1 to verify that the transponder 1 is operating correctly, i.e., that the data was actually stored in the transponder 1 during the write operation. The controller 60 can operate the transceiver 42 at a first power level during each of the read operations, and at a second, higher power level during the write operation. The power levels for each of the reading and writing operations can be optimized to provide effective reading and writing of a particular transponder 1 without reading or writing other transponders 1 on the carrier substrate 13. The reading and writing operations can be performed in any order, i.e., with either a reading or writing operation occurring first, and a reading or writing operation occurring thereafter. Further, the designation of the power levels as "first" and "second" does not indicate the temporal occurrence or use of the power levels.

Typically, for a transponder 1 in a particular proximity with the near field coupler 30, the transceiver 42 must provide a greater power for writing to the transponder 1 than for reading from the transponder 1. That is, the power requirement for writing to the transponder 1 is higher than the power requirement for reading. Thus, according to one embodiment of the present invention, the transceiver 42 can be powered at a higher level during the writing operations so that the transceiver 42 can write to the transponder 1 whenever the transponder 1 is sufficiently close for reading by the transceiver 42 at the lower reading power. In other words, the transceiver 42 can be configured so that the region in which the transceiver 42 can effectively write to the transponder 1 is the same, or substantially the same, as the region in which the transceiver 42 can effectively read from the transponder 1. By controlling the power of the transceiver 42 in this way, the controller 60 can provide sufficient power for reading from and writing to a particular transponder 1, while preventing both reading from and writing to other transponders 1 that are outside a designated positional range.

A higher power level during the writing operation generally increases the likelihood of the transceiver 42 writing to the transponder 1, despite variations in the location and configuration of the transponder 1. As shown in FIGS. 5a and 5b and discussed above, the transponder 1 can have a relatively short dimension in the feed direction of the carrier substrate 13 so that the transponders 1 define relatively long spaces therebetween and only one transponder 1 is affected by the different leakage regions of the narrow field coupler 30. However, in other embodiments of the present invention, it may be desirable to provide the transponders 1 with different configurations and/or in different positions. For example, as shown in FIG. 6a, each transponder 1 can extend by a greater distance in the feed direction along the feed path 26 of the printer 16, such that the space between the transponders 1 is reduced. Further, as shown in FIG. 6b, the placement of the transponders 1 on the carrier substrate 13 can be nonuniform. That is, some of the transponders 1 can be closer to one of the transverse edges of the carrier substrate 13, and/or successive transponders 1 along the carrier substrate 13 can define nonuniform distances therebetween. In some cases, such variations and/or nonuniformities in the configuration and placement of the transponders 1 can increase the effective distance between the near field coupler 30 and the transponder 1 being read or written. By writing at a sufficiently high power, the transceiver 42 can still write to a particular one of the transponders 1 even if the transponder 1 is further from the transceiver 42. However, it is generally desirable to not use an excessive power for the writing operations, e.g., to avoid inadvertently writing to adjacent transponders 1 along the carrier substrate 13. Further, the transceiver 42 can read from the particular transponder 1 using a lower reading power to avoid reading from other transponders.

The power level of the transceiver 42 during the reading and writing operations affects the likelihood of the transceiver 42 successfully reading from or writing to the transponder 1. Generally, a range of power levels can be used for reading from or writing to each of the transponders 1. However, if the power level of the transceiver 42 during a reading or writing operation is too low, the transceiver 42 will not successfully communicate with the transponder 1, i.e., data will not be read from or written to the transponder 1. Alternatively, if the power level of the transceiver 42 is too high, the transponder 1 will be rendered inactive, and the communication will fail.

The minimum and maximum power levels of the transceiver 42 for communicating with the transponder 1 is affected by a number of characteristics of the components and operating conditions. For example, different types of transponders 1 are characterized by different antennas, chips, and operating protocols. Therefore, each type of transponder 1 typically has different requirements including the required power level of the signal from the transceiver 42 during communication. In fact, even among transponders 1 of a particular type, slight variations in the structure of each transponder 1 can affect the sensitivity of each transponder 1 and, hence, the power requirements for communication. In some cases, the power requirements for transponders 1 of the same type vary by 50% or more. In addition, the power required for communicating with the transponder 1 is determined, in part, by the proximity of the transponder 1 to the transceiver 42 and/or the near field coupler 30. That is, if the transponder 1 is closer to the near field coupler 30, the minimum power level for communication therebetween is typically less than if the transponder 1 is farther from the near field coupler 30. If the transponders 1 are arranged nonuniformly on the carrier substrate 13 such as is illustrated in FIG. 6b, or if the carrier substrate 13 is not advanced by uniformly incremental distances along the feed path 26, varying power levels may be required for communication between the transceiver 42 and the transponders 1. Further, the transponders 1 typically have different sensitivities at different operating frequencies. In this regard, it is noted that while the transceiver 42 operates at a nominal frequency, such as 915 MHz, the actual operating frequency of the transceiver 42 varies throughout a range of frequencies, such as between about 902 MHz and 928 MHz. Within this range, each transponder 1 may respond to signals of different power levels from the transceiver 42.

Figures 7, 8:
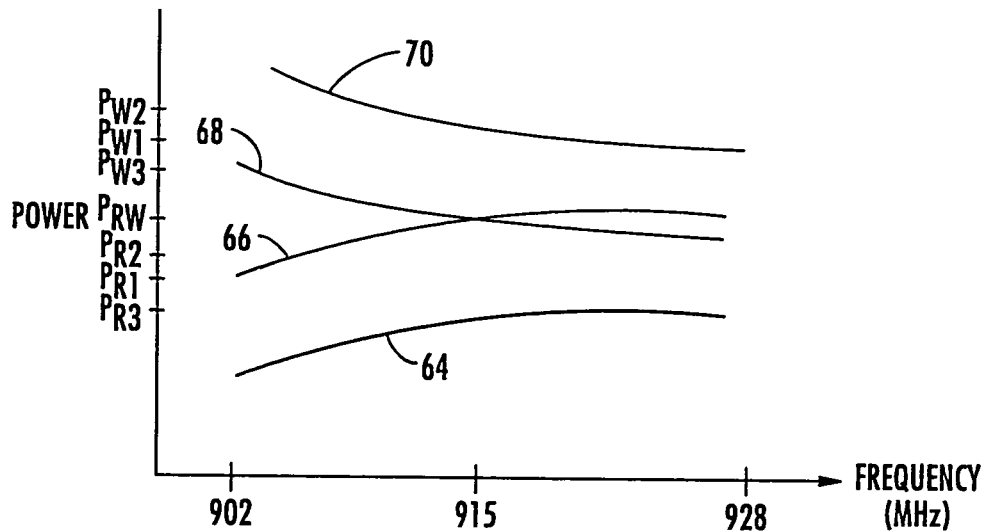
FIG. 7 is a graph illustrating the power levels at which the transceiver can communicate with an exemplary transponder at a particular distance from the transponder.
FIG. 8 is a chart illustrating a look-up table according to one embodiment of the present invention for providing values characteristic of power levels of the transceiver for communicating with particular types of transponders.
Figure 9:
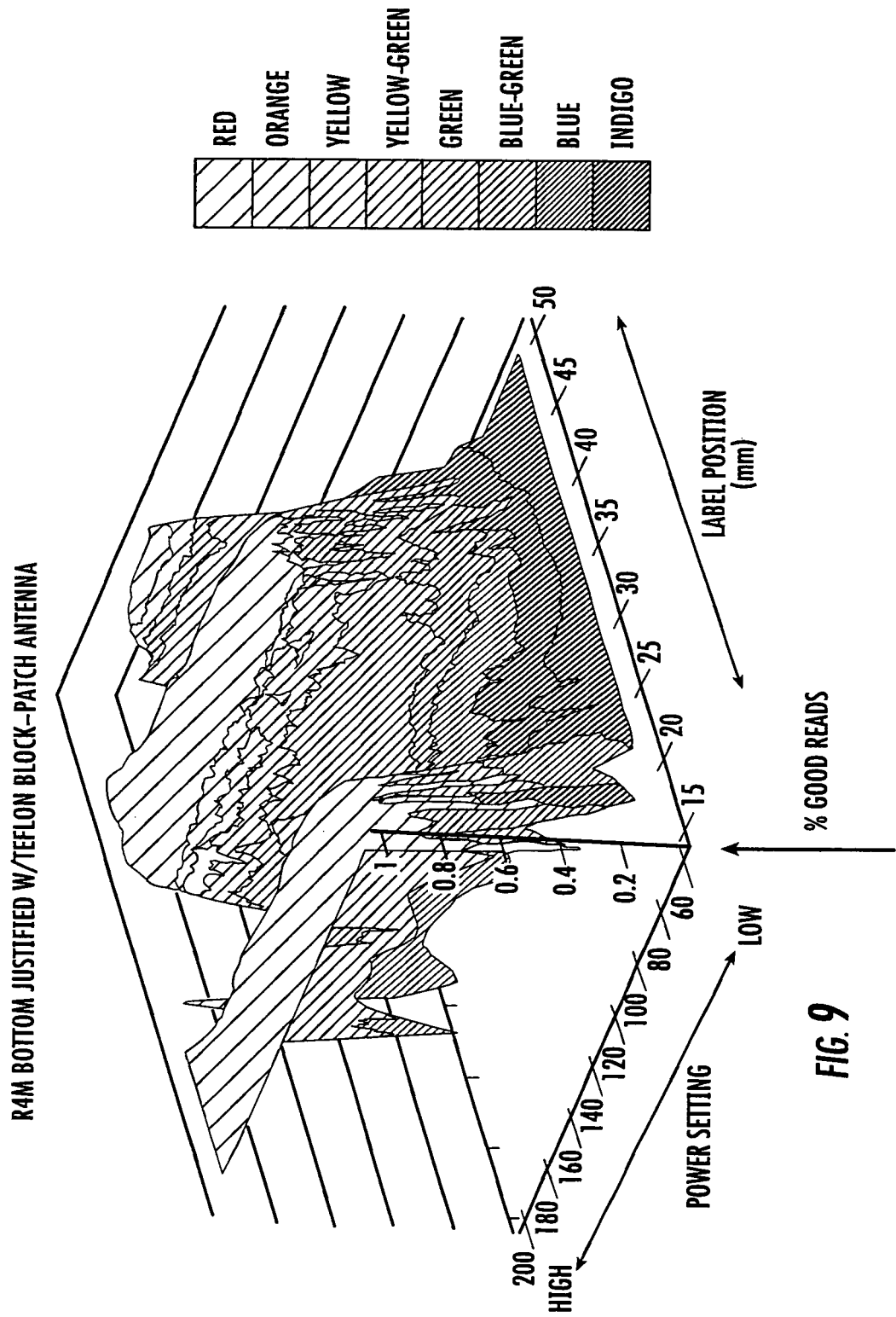
FIG. 9 is a three-dimensional chart illustrating the read success rate for a particular type of transponder at different power levels and positions relative to the transceiver.
Figure 9A:
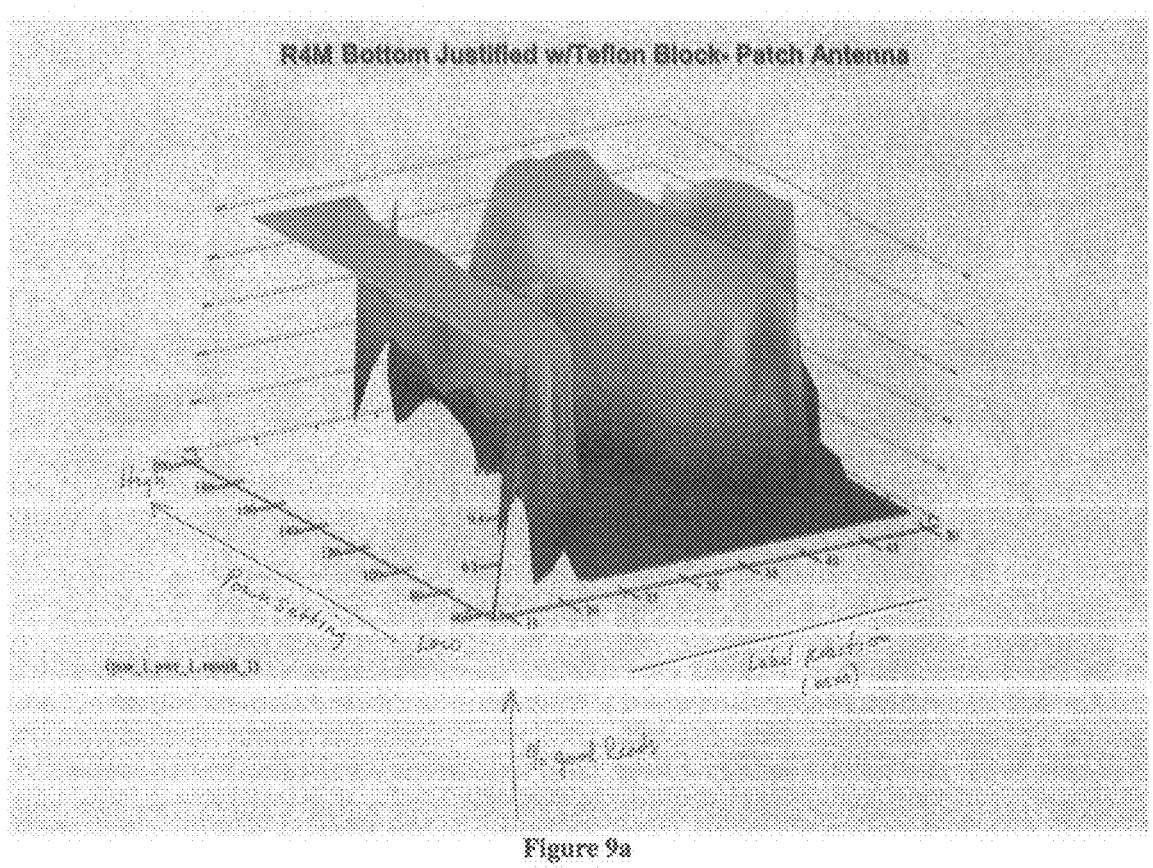
FIG. 9a is a color three-dimensional chart corresponding to FIG. 9.

FIG. 7 illustrates the power requirements of the transceiver 42 for communicating with a particular type of transponder 1, with the transponder 1 positioned in a particular proximity to the transceiver 42. In particular, lines 64, 66 are representative of minimum and maximum power levels, respectively, for reading from the transponder 1 at a range of frequencies. That is, if the transceiver 42 is operated below the power level indicated by line 64 or above the power level indicated by line 66 for a particular frequency, the transceiver 42 will not successfully read from the transponder 1. Similarly, lines 68, 70 are representative of minimum and maximum power levels, respectively, for writing to the transponder 1 at a range of frequencies. That is, if the transceiver 42 is operated below the power level indicated by line 68 or above the power level indicated by line 70 for a particular frequency, the transceiver 42 will not successfully write to the transponder 1.

In some cases, a single power level of the transceiver 42 can be used for reading from and writing to the transponder 1. For example, as shown in FIG. 7, maximum power level for the read operation can be greater, for some or all frequencies, than the minimum power level for the write operation. Thus, the transceiver 42 can be powered at a power level such as $P_{RW}$ that is within the acceptable ranges of power levels for at least some of the frequencies of operation for both reading and writing.

Alternatively, the transceiver 42 can be powered at one or more different levels during each of the reading and writing operations. The values can be determined according to maximize the probabilistic chance of achieving successful communication with the transponders 1. Values characteristic of the different power levels can be stored in the memory 62, such that the controller 60 can access the values during the different operations and thereby control the transceiver 42, e.g., according to the different instructions of a software program for controlling the operation of the printer 16. During typical read and write operations, the transceiver 42 can be powered at first read and write power levels $P_{R1}$, $P_{W1}$, respectively, as indicated in FIG. 7. If a communication operation between the transceiver 42 and transponder 1 is not successful, the transceiver 42 can repeat the failed attempt at one or more different operating power levels. Of course, since the frequency typically varies throughout the operation of the transceiver 42, the subsequent attempts can also be performed at different frequencies. In this regard, FIG. 8 illustrates a look-up table that can be stored in memory 62 and which includes a number of read power levels $P_{R1}$, $P_{R2}$, $P_{R3}$, and write power levels $P_{W1}$, $P_{W2}$, $P_{W3}$. The memory 62 can include any number of power levels for each type of operation. If the first attempt to read a transponder 1 at the first read power level $P_{R1}$ fails, the controller 60 can then operate the transceiver 42 at the second power level $P_{R2}$ during a second attempt to read the transponder 1, and then at a third power level $P_{R3}$ during a third attempt to read the transponder 1. In some cases, the controller 60 can attempt to perform the operation at each frequency more than once. Typically, the controller 60 is configured to attempt to perform each operation no more than a predetermined maximum number of times before rejecting the transponder 1 as defective. Of course, if the operation is successful before the predetermined number of attempts is reached, the controller 60 can proceed with the next operation, such as writing to the transponder 1 or communicating with a subsequent transponder 1. Also, as shown in FIG. 8, the memory 62 can store other power levels $P_{R1}'$, $P_{R2}'$, $P_{R3}'$, $P_{W1}'$, $P_{W2}'$, $P_{W3}'$, $P_{R1}''$, $P_{R2}''$, $P_{R3}''$, $P_{W1}''$, $P_{W2}''$, $P_{W3}''$ for performing reading and writing operations with other types of transponders 1 or transducers 1 in other configurations. In any case, the write power level for a particular type of transponder 1 can be greater than the read level for the same transponder 1. For example, in one embodiment, the write power can be up to about 3 times as great as the read power. Thus, the transducer 42 can be configured to write to and read from spatial regions that are equal, or substantially equal, in area or size.

Figure 10:
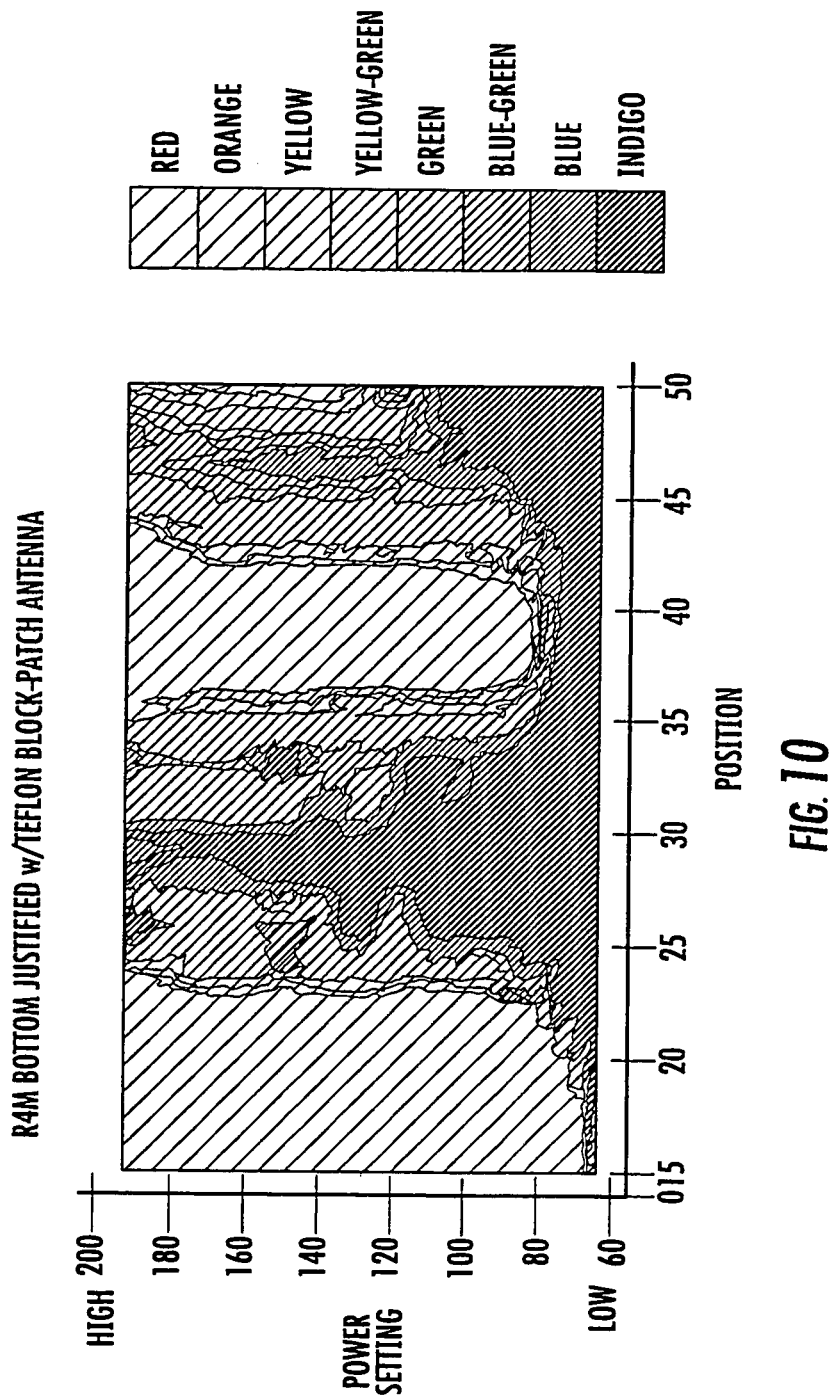
FIG. 10 is a two-dimensional chart corresponding to FIG. 9.
Figure 10A:
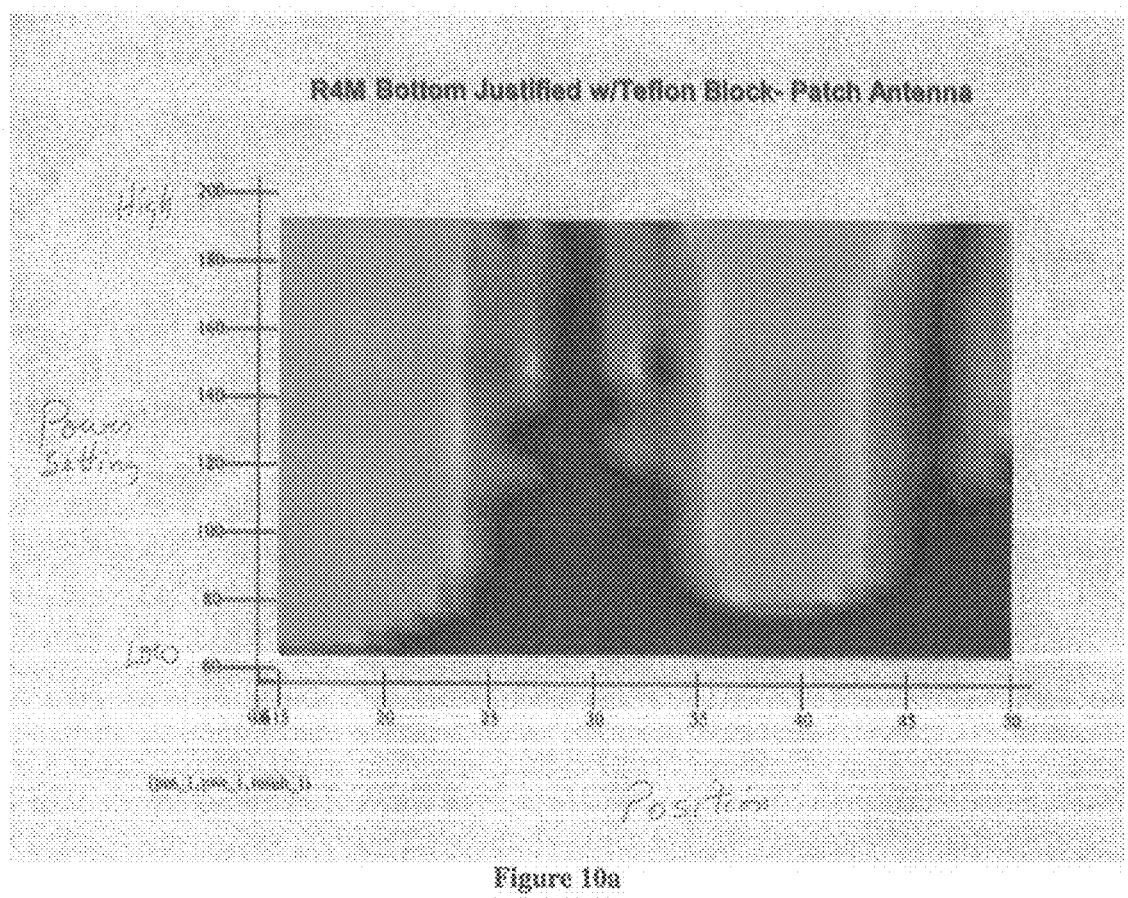
FIG. 10a is a color two-dimensional chart corresponding to FIG. 10.

FIGS. 9, 9a, 10, and 10a illustrate read success rates of a particular type of transponder 1 at different power levels and positions relative to the transceiver 42. A range of "power settings" between 60 and 200 are indicated along a first axis of the graph, each power setting corresponding to a particular power value for the transceiver 42. The proximity of the transponder 1 relative to the transceiver 42 is indicated by the "label position" measured in millimeters along the feed path 26 of the printer 16. The read success rate is indicated along the third axis, i.e., a percent of the total attempts of reading the transponder 1. The graph of FIGS. 9 and 9a was constructed empirically by testing transponders 1 of a particular type and at the various power settings and positions. Similar data can also be determined theoretically or by other methods. FIGS. 10 and 10a are two-dimensional charts corresponding to FIGS. 9 and 9a. That is, the power setting and position values are indicated on the two axes, and the success rate is indicated only by intensity/darkness. The intensity values generally correspond with the rates indicated along the third axis of FIGS. 9 and 9a, i.e., generally ranging from dark/high intensity (low or no success) to light/low intensity (100% success).

At certain positions, the transceiver 42 achieves high success substantially independent of the power of the transceiver 42. For example, for position values between about 15 and 23 mm, the read success rate is high except at very low power settings. Similarly, at position values between about 35 and 43 mm, the transceiver 42 communicates with high success, except at low power settings. At the highest power settings, the ranges of positions associated with high success rates are slightly larger than the ranges of positions at lower power settings. Thus, throughout a range of power settings between about 90 and 180, a high read success rate is achieved in two significant ranges of position. However, it is also shown that a high success rate is achieved at power levels above about 130, for a position of about 50 mm. Therefore, the power setting can be limited to a range of power settings between about 90 and 110 in order to restrict the positional range of the reading operation, i.e., to prevent reading of multiple transponders 1 along the carrier substrate 13.

Figure 11:
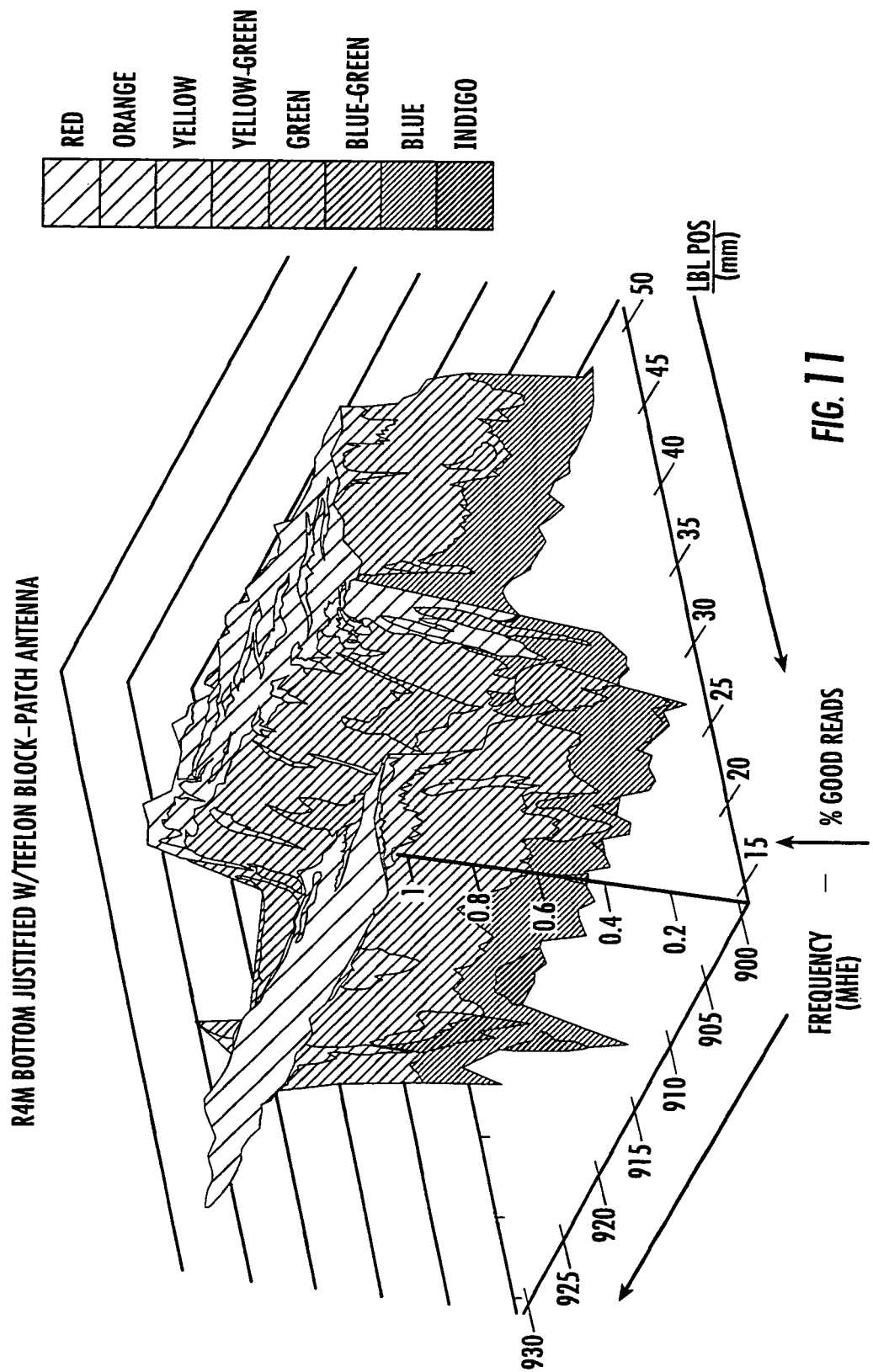
FIG. 11 is a three-dimensional chart illustrating the read success rate for a particular type of transponder at different frequencies and positions relative to the transceiver.
Figure 11A:
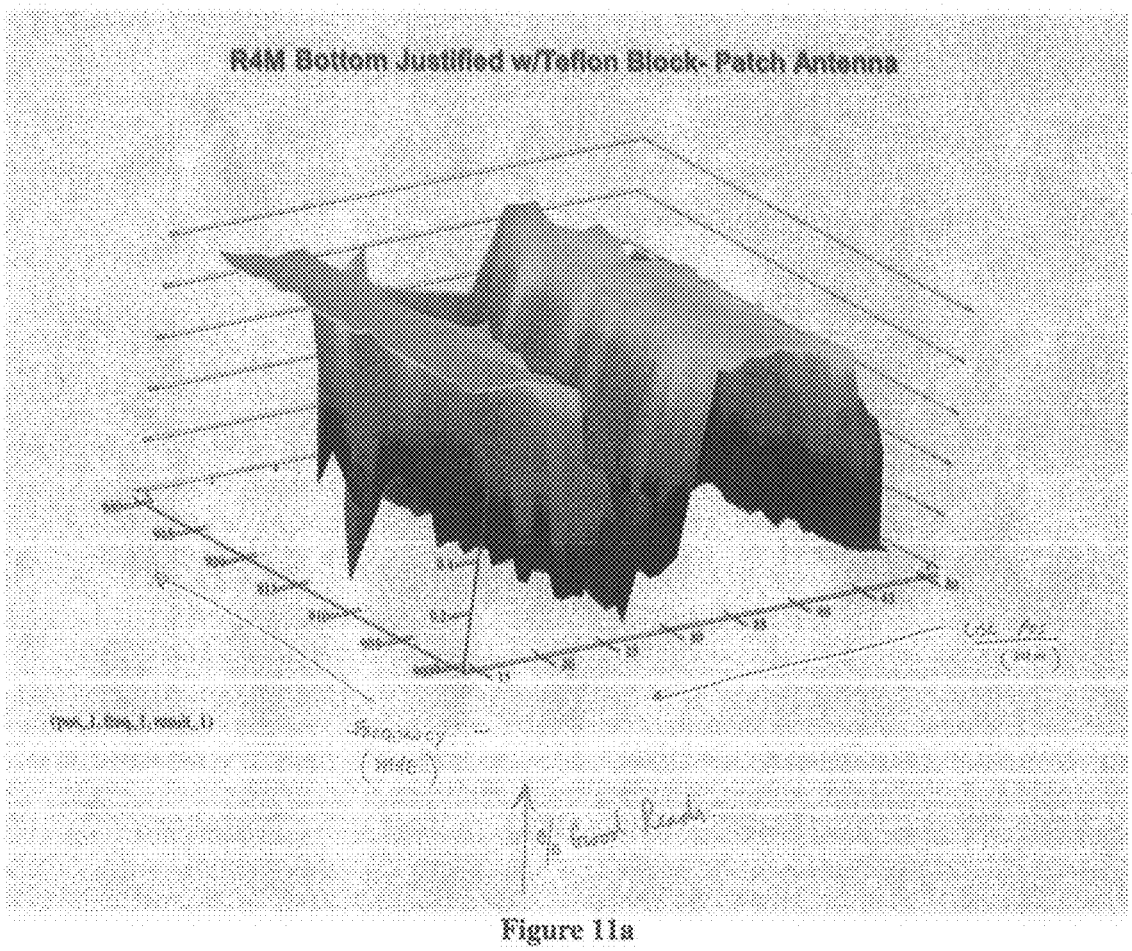
FIG. 11a is a color three-dimensional chart corresponding to FIG. 11.
Figure 12:
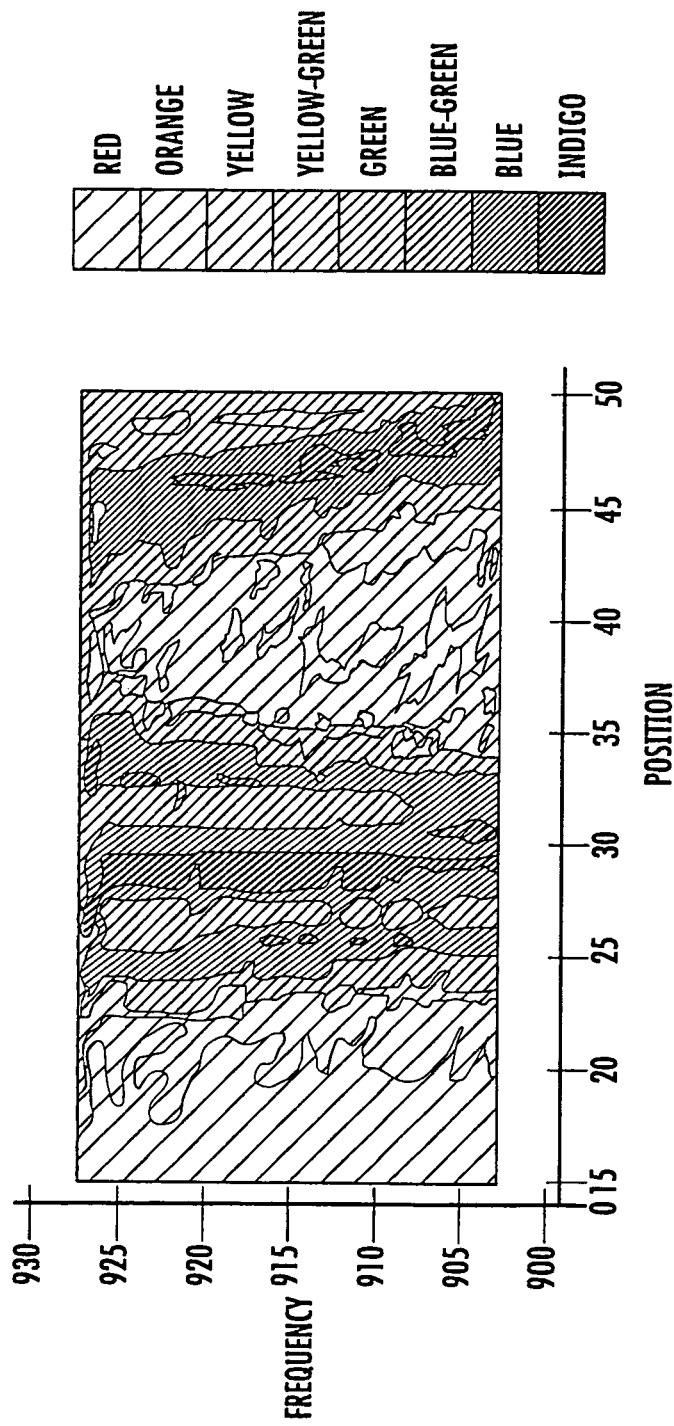
FIG. 12 is a two-dimensional chart corresponding to FIG. 11.
Figure 12A:
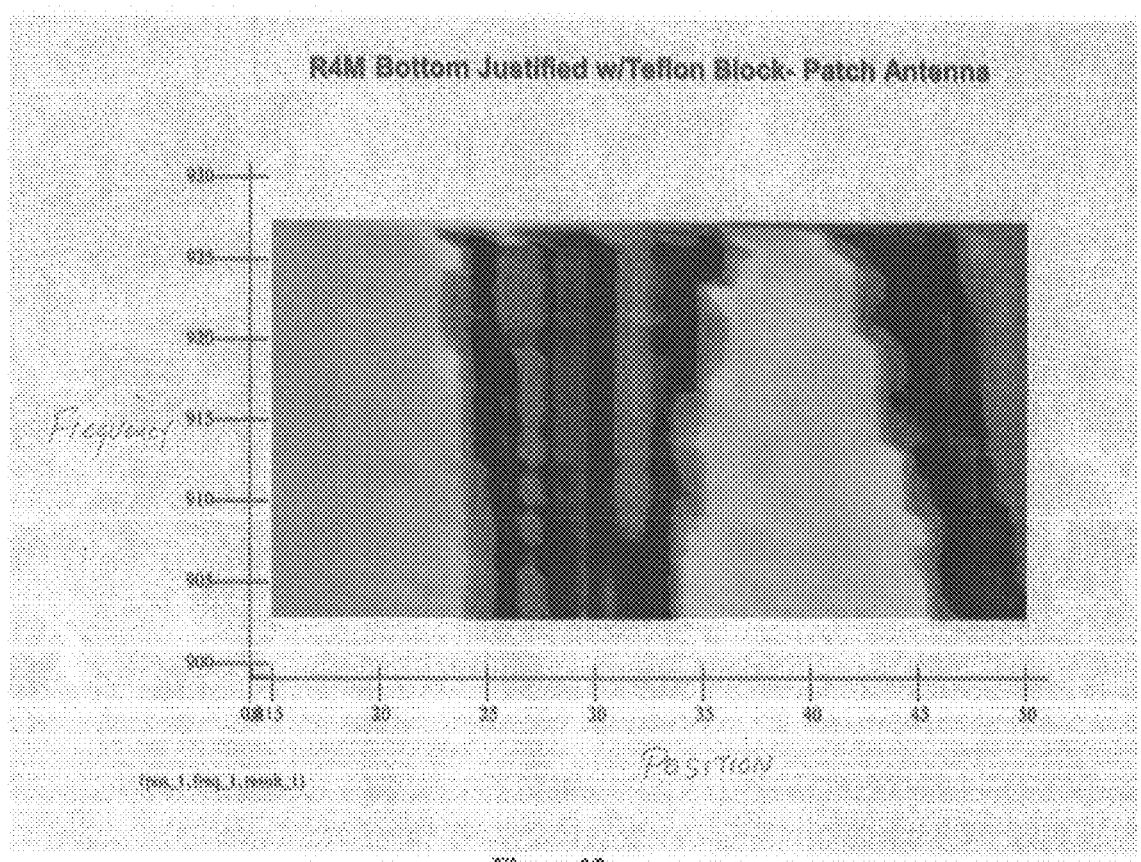
FIG. 12a is a color two-dimensional chart corresponding to FIG. 12.

Similarly, FIGS. 11, 11a, 12, and 12a illustrate read success rates of a particular type of transponder 1 at different frequency levels and positions relative to the transceiver 42. That is, each of FIGS. 11 and 11a is three-dimensional chart illustrating the read success rate of a particular type of transponder 1 at a particular power, throughout a range of frequencies and positions relative to the transceiver 42. FIGS. 12 and 12a correspond to FIGS. 11 and 11a, with the read success rate indicated only by intensity/darkness. At positions between about 15 and 21 mm and between about 36 and 42 mm, the read success rate is high and substantially independent of frequency. Thus, a high read success rate can be achieved by operating the transponder 1 at a power setting of between about 90 and 110, with the transponder 1 at positions of between about 15 and 21 mm. Further, at this range of power settings, the read success rate for transponders 1 located at other positions, e.g., positions greater than about 45 mm, is low. Thus, the transceiver 42 can effectively read from a transponder 1 positioned in a relatively narrow range of positions so that communication with other transponders 1 outside the positional range is prevented.

While the foregoing graphs illustrate the significance of power, position, and frequency on the read success rate, it is appreciated that similar analysis can be conducted to determine the applicable power, position, and frequency ranges for the write success rate of the transceiver 42 for a particular type of transponder 1. In this way, a range of power levels can be determined throughout which the transceiver 42 achieves a high write success rate with a transponder 1 located in a specified position range. If the position ranges for the read and write operations are the substantially same, the transceiver 42 can read from and write to a transponder 1 located in the position range while preventing communication with transponders 1 located outside that range. Thus, even if the transponders 1 are located close to one another on the carrier substrate 13, the transceiver 42 can communicate with a particular one of the transponders 1.

In some cases, the controller 60 can be configured to operate the transceiver 42 at different power levels according to other operating parameters such as the type of transponder 1, the type of carrier substrate 13 or web 24 of media 11, and the like. For example, the sensitivity of the transponder 1 to communication signals from the transceiver 42 can be affected by the carrier substrate 13, the web 24, or other materials in close proximity to the transponder 1. However, by setting the power levels of the transceiver 42 according to these factors, the transceiver 42 can consistently achieve high communication success rates with a transponder 1 in a predetermined position along the feed path 26 while simultaneously preventing inadvertent communication with other transponders 1 on the carrier substrate 13. The controller 60 or other member of the printer can automatically detect the operating parameters, e.g., by reading data from the transponders 1, so that the controller 60 can automatically use corresponding power levels from the memory 62. Alternatively, an operator can enter operating parameters, or the printer 16 can be configured to use predetermined power level(s) regardless of the type of transponder 1 on the carrier substrate 13.

According to one embodiment of the present invention, there is provided a method for communication with a transponder. The method comprises a) positioning a transponder in a transponder operating region with a transponder axis oriented along a predetermined direction, the smallest dimension of said transponder in said predetermined direction being significantly less than a dimension of said transponder operating region in said predetermined direction; b) with an RF communication signal, forming an array of near field concentrations in said transponder operating region, said near field concentrations extending transversely to said predetermined direction and spaced along said predetermined direction; and c) communicating with said transponder with said RF encoding signal, d) the spacing of said near field concentrations in said predetermined direction being significantly less than said smallest dimension of said transponder in said predetermined direction such that said transponder overlaps and is excited by a plurality of said near field concentrations when located in said transponder operating region. In one case, a plurality of transponders is individually communicated with by sequential passage through the transponder operating region via a media conveyance.

A method for communication with a transponder provided by another embodiment of the present invention comprises positioning the transponder over a spaced array of near field concentrations of an RF communication signal, the spacing of said near field concentrations being such relative to the dimensions of said transponder that said transponder overlaps and is excited by a plurality of said near field concentrations. For example, the spaced array can be a parallel array of leaky edges having the near field concentrations.

In another embodiment, the present invention provides a method of adaptively communicating with a transponder. The method comprises positioning the transponder contiguous with a pattern of spaced near field concentrations of an RF communication signal, the pattern having at least one undesired low energy zone within which transponder communication is not optimally performed; exciting the transponder with the near field concentrations; confirming valid communication; if valid communication is not confirmed, moving the transponder a distance; repeating said exciting, confirming, and moving actions until a valid communication of the transponder is confirmed.

The present invention also provides a method for communication with transponders having a range of sizes from smallest to largest. The method provides a) with an RF communication signal, forming an array of spaced near field concentrations in a transponder operating region, the spacing of said near field concentrations being less than the smaller of the length and width dimensions of said smallest transponder such that all transponders in said range of sizes overlap and are excited by a plurality of said near field concentrations when located proximate said transponder operating region; b) positioning proximate said transponder target sector a transponder having a size in said range of transponder sizes, and c) communicating with said transponder.

According to still another embodiment of the present invention, there is provided a method for communication with a transponder. The method includes: with an RF communication signal, forming a near field concentration pattern in a transponder operating region larger than the transponder; locating a transponder at a first position in said transponder operating region; determining a first signal power level operationally effective to communicate with said transponder when located in said first position; storing said associated first power level and transponder position; positioning said transponder or a similar transponder in a second position in said transponder operating region; determining a second signal power level operationally effective to communicate with said transponder when located in said second position; storing said associated second power level and transponder position; and operationally communicating with a series of transponders located in said first and second positions in said transponder operating region using the stored first and second signal power levels respectively associated with the first and second positions of transponders in said transponder operating region. In one case, the method also includes storing a type of the transponder.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of communicating with a transponder on a carrier substrate in a printer, comprising:
energizing a transceiver to a plurality of power levels to communicate with the transponder, as the transponder is moving along a media feed path and being disposed at a plurality of distances from the transceiver,
wherein:
when energized to each of the power levels, the transceiver is configured to generate ultra-high frequency (UHF) signals for near field effect communication with the transponder; and
each of the power levels is independent of frequency of the UHF signals;
determining rates of successful communication between the transceiver and the transponder for the power levels and for the distances between the transceiver and the transponder; and
selecting a first power level associated with a relatively high rate of successful communication between the transceiver and the transponder for a limited range of distances between the transceiver and the transponder.

2. The method of claim 1, wherein the determining rates of successful communication includes determining a plurality of read success rates and a plurality of write success rates for the power levels and for the distances between the transceiver and the transponder, and further comprising selecting a select distance, the first power level, and a second power level, the first power level being associated with the relatively high write success rate at the limited range of distances including the select distance and the second power level being associated with relatively high read success rate at the limited range of distances including the select distance.

3. The method of claim 1 further comprising:
generating the ultra-high frequency signals at the first power level; and
generating ultra-high frequency near field concentrations based on the ultra-high frequency signals for the near field effect communication with the transponder at the limited range of distances between the transceiver and the transponder.

4. The method of claim 1, wherein generating the ultra-high frequency signals at the first power level includes generating the ultra-high frequency signals at one or more frequencies within a band of ultra-high frequencies.

5. The method of claim 4, wherein generating the ultra-high frequency signals at the first power level includes generating at a nominal frequency of about 915 MHz and within a range of frequencies between about 902 MHz and 928 MHz.

6. The method of claim 1, wherein the transponder is an ultra-high frequency transponder.

* * * * *